United States Patent
Bender et al.

(10) Patent No.: US 10,724,890 B2
(45) Date of Patent: Jul. 28, 2020

(54) APPARATUS AND METHOD FOR MEASURING A VOLUME OF A LIQUOR DISPENSED FROM A BOTTLE

(71) Applicant: CBENDER, INC., Gotha, FL (US)

(72) Inventors: Chad Louis Bender, Gotha, FL (US); Jonathan M. Contigiani, Winter Park, FL (US)

(73) Assignee: CBENDER, INC., Gotha, FL (US)

( * ) Notice: Subject to any disclaimer, the term of this patent is extended or adjusted under 35 U.S.C. 154(b) by 232 days.

(21) Appl. No.: 15/677,362

(22) Filed: Aug. 15, 2017

(65) Prior Publication Data

US 2018/0045548 A1 Feb. 15, 2018

Related U.S. Application Data

(60) Provisional application No. 62/375,124, filed on Aug. 15, 2016.

(51) Int. Cl.
*G01F 23/00* (2006.01)
*G01F 22/00* (2006.01)
(Continued)

(52) U.S. Cl.
CPC .......... *G01F 23/0007* (2013.01); *G01F 22/00* (2013.01); *G01F 23/00* (2013.01);
(Continued)

(58) Field of Classification Search
CPC .......... G01F 17/00; G01F 19/00; G01F 22/00; G01F 23/00; G01F 23/0007; G01F 23/02;
(Continued)

(56) References Cited

U.S. PATENT DOCUMENTS 1,683,191 A * 9/1928 Huntley ................. B65D 1/04
73/427
3,672,061 A 6/1972 Alessi
(Continued)

FOREIGN PATENT DOCUMENTS

CH 659129 12/1986
GB 2394936 5/2004
(Continued)

OTHER PUBLICATIONS http://alcoholcontrols.com/shotglance.html#.V5qi_LgrJhE; Jul. 2016, 4 pgs.
(Continued)

*Primary Examiner* — Benjamin R Schmitt
(74) *Attorney, Agent, or Firm* — Beusse, Wolter, Sanks & Maire PLLC; Robert L. Wolter

(57) ABSTRACT

An apparatus for measuring a volume of liquor dispensed from a bottle may have at least one transparent substrate having a first side and an opposite second side. A shaded background is on the first side or second side and outlining at least one transparent bottle profile of a geometric shape of a bottle corresponding to a brand of liquor. In addition, at least one volume scale is on one of the sides of the substrate and the at least one scale is associated with the at least one bottle profile to measure a level of liquor in the bottle.

10 Claims, 4 Drawing Sheets

(51) Int. Cl.
*G01F 23/02* (2006.01)
*B67D 3/00* (2006.01)

(52) U.S. Cl.
CPC ............ *G01F 23/02* (2013.01); *B67D 3/0093* (2013.01); *B67D 2210/00091* (2013.01)

(58) Field of Classification Search
CPC ................ B67D 1/0871; B67D 3/0093; B67D 2210/00091
USPC .................................... 73/149, 426, 427, 428
See application file for complete search history.

(56) References Cited

U.S. PATENT DOCUMENTS

| | | | |
|---|---|---|---|
| 4,550,602 | A | 11/1985 | Burke et al. |
| 6,616,037 | B2 | 9/2003 | Grimm et al. |
| 6,966,121 | B2 | 11/2005 | Bolle |
| 7,725,365 | B2 | 5/2010 | Westberg |
| 2002/0095806 | A1* | 7/2002 | Bolle ............... G01F 19/00 33/494 |
| 2004/0143511 | A1 | 7/2004 | Miller et al. |
| 2006/0121163 | A1 | 6/2006 | Holloway |
| 2008/0276703 | A1 | 11/2008 | Holloway |
| 2014/0149265 | A1 | 5/2014 | Kundra |

FOREIGN PATENT DOCUMENTS

| | | |
|---|---|---|
| GB | 2436674 | 10/2007 |
| WO | 2001057480 | 8/2001 |

OTHER PUBLICATIONS http://possector.com/management/liquor-inventory-control; Jul. 2016, 11 pgs.
http://www.drinkstuff.com/products/product.asp?ID=7303#.V5qjlBgrJhE; Jul. 2016, 3 pgs.

* cited by examiner

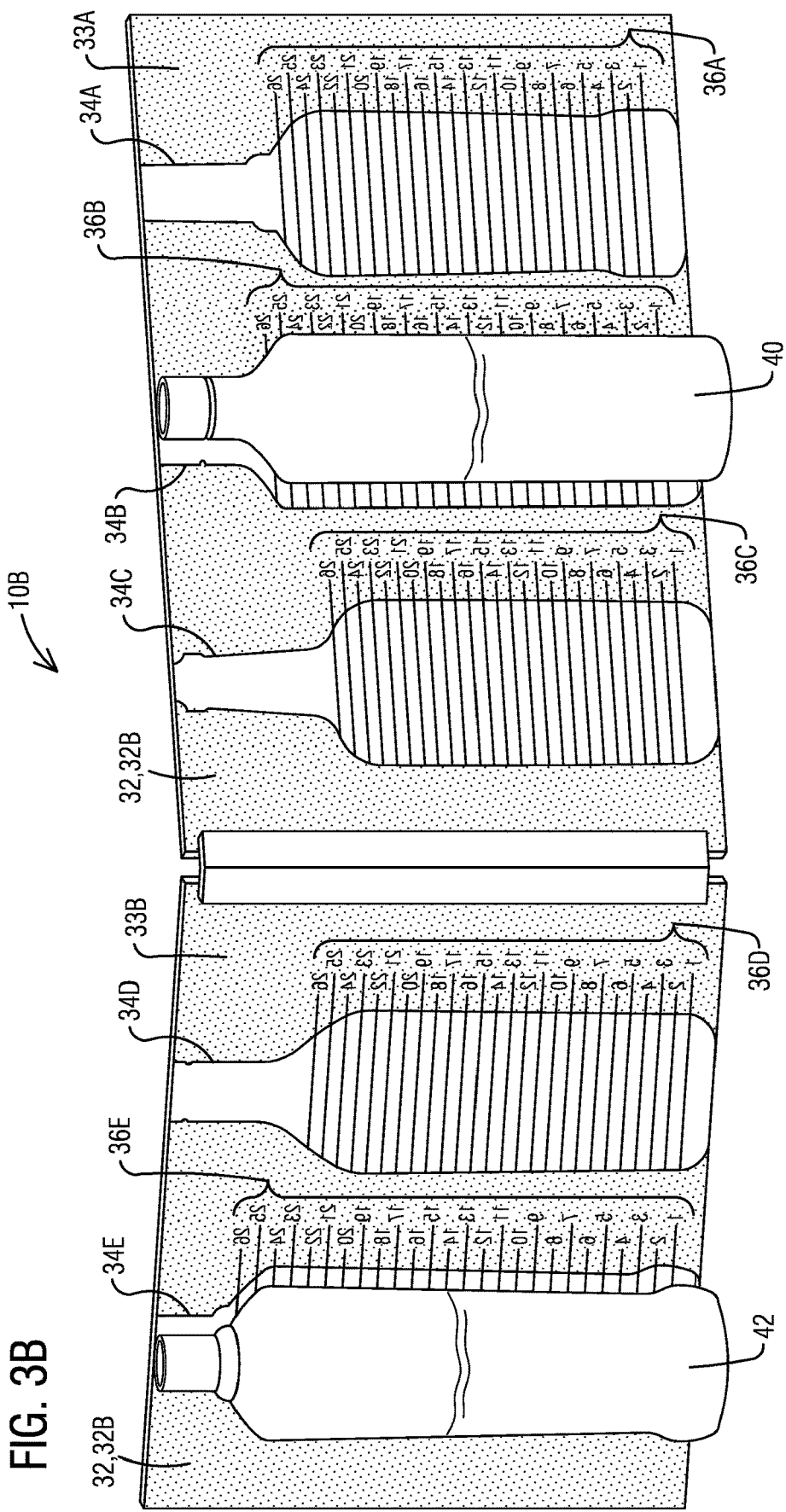

APPARATUS AND METHOD FOR MEASURING A VOLUME OF A LIQUOR DISPENSED FROM A BOTTLE

FIELD OF THE INVENTION

Embodiments of the invention relate to apparatuses and methods for measuring volumes of a liquid in a bottle. More specifically, aspects of the invention pertain to such devices and methods for determining an amount of liquor dispensed from a bottle over a prescribed time period.

BACKGROUND OF THE INVENTION

Managing alcoholic beverage inventories is often overlooked in terms of monitoring amounts of alcohol or liquor that is dispensed over any given time period. For example, when alcoholic beverages are served at a planned event, the customer sponsoring the event is charged based on the amount of alcohol that is dispensed during the time period when the bar is opened and then closed for service. Typically, a bar manager or bar tender will check the volume levels of liquor in bottles before an event begins and after the event is over to determine the amount of liquor dispensed during the event. However, this level of inventory monitoring is performed by a bar manager essentially "eye-balling" the volume levels of liquor in the bottle. This particular method results in inaccurate estimations of the amount of liquor dispensed during the event, which in turn results in over or under billing the customer.

Prior art devices may include an electro-mechanical device that may include a spout with one or more sensors that detect amounts of liquor dispensed from a bottle during pouring, and some sort of computing device that records dispensed volumes; however, these systems are expensive and complicated to incorporate into hospitality management software. Alternatively, cards with scales for measuring liquor volumes exist, but these can be cumbersome to use. Accordingly, a need exists for systems and methods for accurately monitoring liquor volumes of bottles that is inexpensive and easy to use.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 3B is a rear perspective of the embodiment of FIG. 3A.

DETAILED DESCRIPTION OF THE INVENTION

Figure 1A:
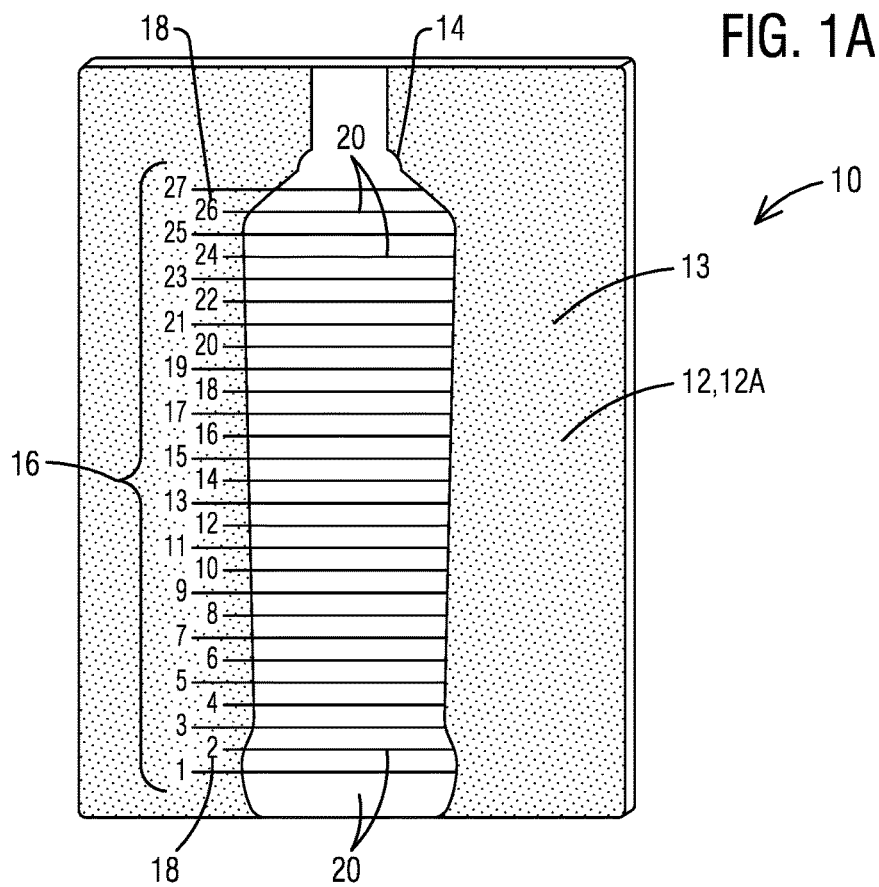
FIG. 1A is a front perspective view of a first embodiment of a printed or marked substrate in accordance with aspects of the invention.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1B:
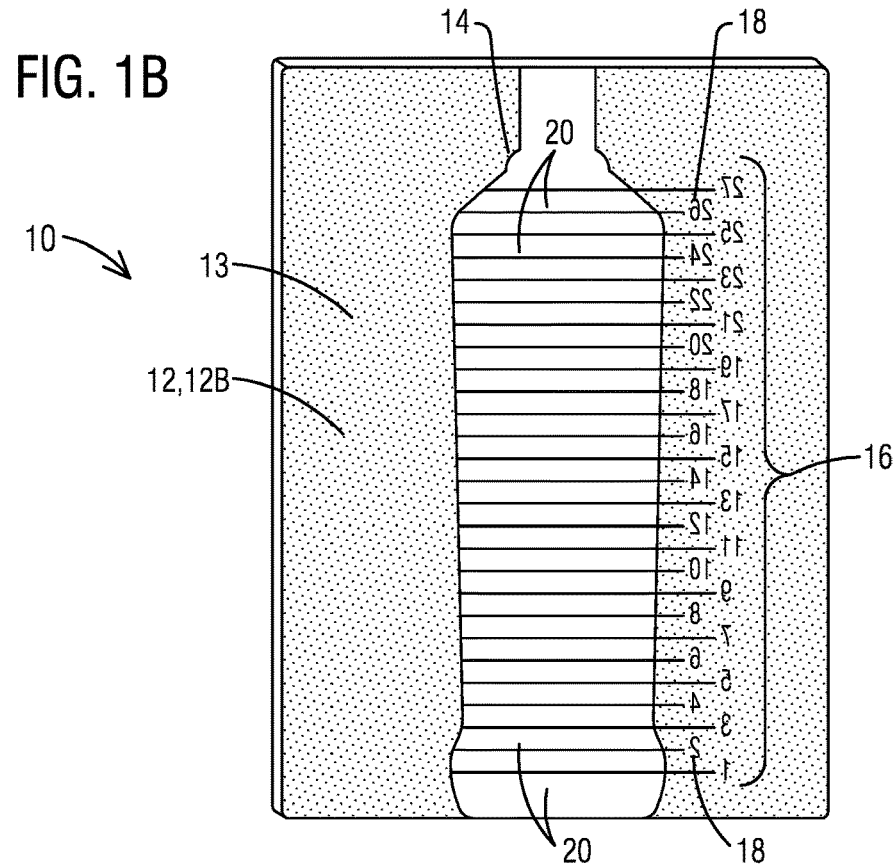
FIG. 1B is a rear perspective view of the printed or marked substrate of FIG. 1.

Aspects of the invention may include a transparent substrate capable of receiving and supporting a printing or marking material to display an image on a surface of the substrate. In particular, at least one bottle profile is displayed on a surface of the substrate. In addition, a volume scale for measuring a volume of liquid is associated with the bottle profile. An embodiment of the invention for an apparatus 10 for measuring a volume of a liquid in a bottle is illustrated in FIGS. 1A and 1B, and may include a transparent substrate 12 capable of receiving print or markings. The substrate includes a first side 12A and a second 12B, either or both of which may be capable of receiving print or markings.

In an embodiment, the substrate may be composed of an acrylic resin material or plastic material that is capable of receiving and supporting an ink material. For example, the substrate 12 may be marked using a digital acrylic printing machine, which may include an ultra-violet cured ink; however, the invention is not so limited and the substrate and marking methods may vary according the substrate material and marking methods.

Again with respect to FIGS. 1A and 1B, the second side 12B (or back side) of the substrate 12 is marked to display a bottle profile 14. In this embodiment, the substrate 12 includes a shaded background 13 that outlines or surrounds the bottle profile 14, which corresponds to a geometric shape of a bottle of particular brand of liquor. In addition, a volume scale 16 is preferably, but not necessarily, printed or marked on the second side 12B. The volume scale 16 includes a plurality of markings that represent volume levels. By way of example the markings may include alphanumeric designations 18 and for each alphanumeric designation there is line 20 representing a level of liquor in a bottle associated with the bottle profile 14. According to aspects of the invention, the scale 16 may provide markings 18 and 20 wherein consecutive markings are provided in volumetric increments to represent a volume of liquor dispensed from the bottle for preparation of an alcoholic drink. For example, some establishments pour 1¼ oz. or 1½ oz. of liquor per drink; therefore, with respect to FIGS. 1A and 1B, a volume changing from the markings 24 down to 17 would indicate that about 8.75 oz. or about 10.5 oz have been dispensed over a prescribed time period, depending on the volume for each pour.

As further shown, at least a portion of each line 20 is on the shaded background 13 adjacent to a corresponding number 18. Moreover each line 20 extends across a width of the bottle profile 14 enabling one to better estimate a level of fluid in a bottle.

Figure 2:
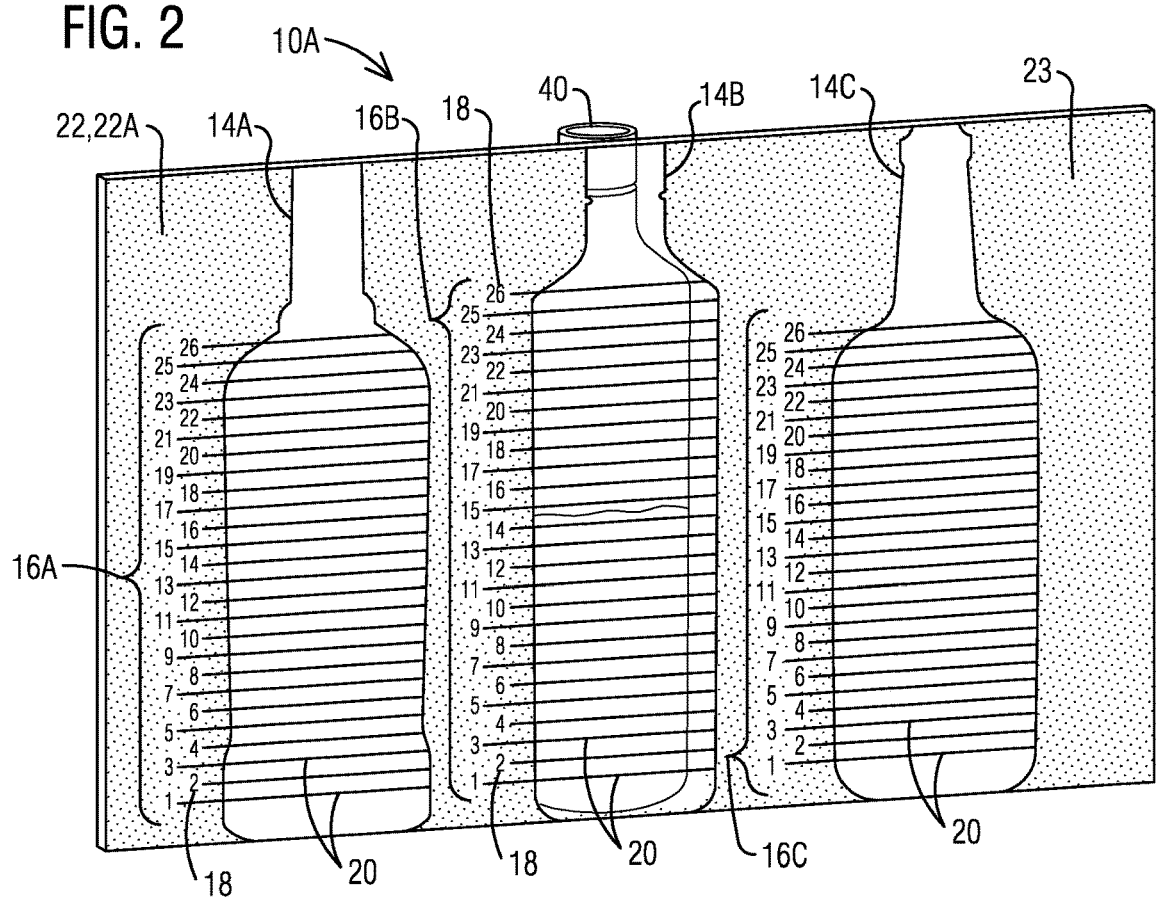
FIG. 2 is a perspective view of a second embodiment of the invention.

With respect to FIG. 2, aspects of the invention are shown in reference to a second embodiment 10A. As shown, a plurality of transparent bottle profiles 14A-14C are displayed on a single substrate 22, and each bottle profile 14A-14C corresponds to a geometric shape of a different brand of liquor bottle. For example, and as shown, the substrate 22 may include a silhouette of a Canadian Club® bottle, a bottle profile of a Jose Cuervo® bottle, and a bottle profile of a Smirnoff® bottle. A shaded background 23 is shown surrounding or defining the bottle profiles 14A-14C. The shaded background 23 and/or the below-referenced scales 16A-16C may be printed on the first side 22A and/or the second side 22B of the substrate 22.

As further shown, a scale 16A-16C is displayed for each bottle profile 14A-14C. Each scale 16A-16C includes a plurality of markings and/or alphanumeric designations 18, 20 representing a volume of liquor for the respective bottle profile 14A-14C. In as much as each bottle profile 14A-14C has a different geometry, the height for each respective volume marking may differ from profile to profile. That is, each scale 16A-16C provides volume markings for a respective bottle brand as represented by the bottle profiles 14A-14C. According to aspects of the invention, the scales 16A-16C may provide numbers 18 and corresponding lines 20, wherein consecutive markings are provided in volumetric increments to represent a volume of liquor dispensed from the bottle for preparation of an alcoholic drink, described above with respect to FIGS. 1A and 1B.

Figure 3A:
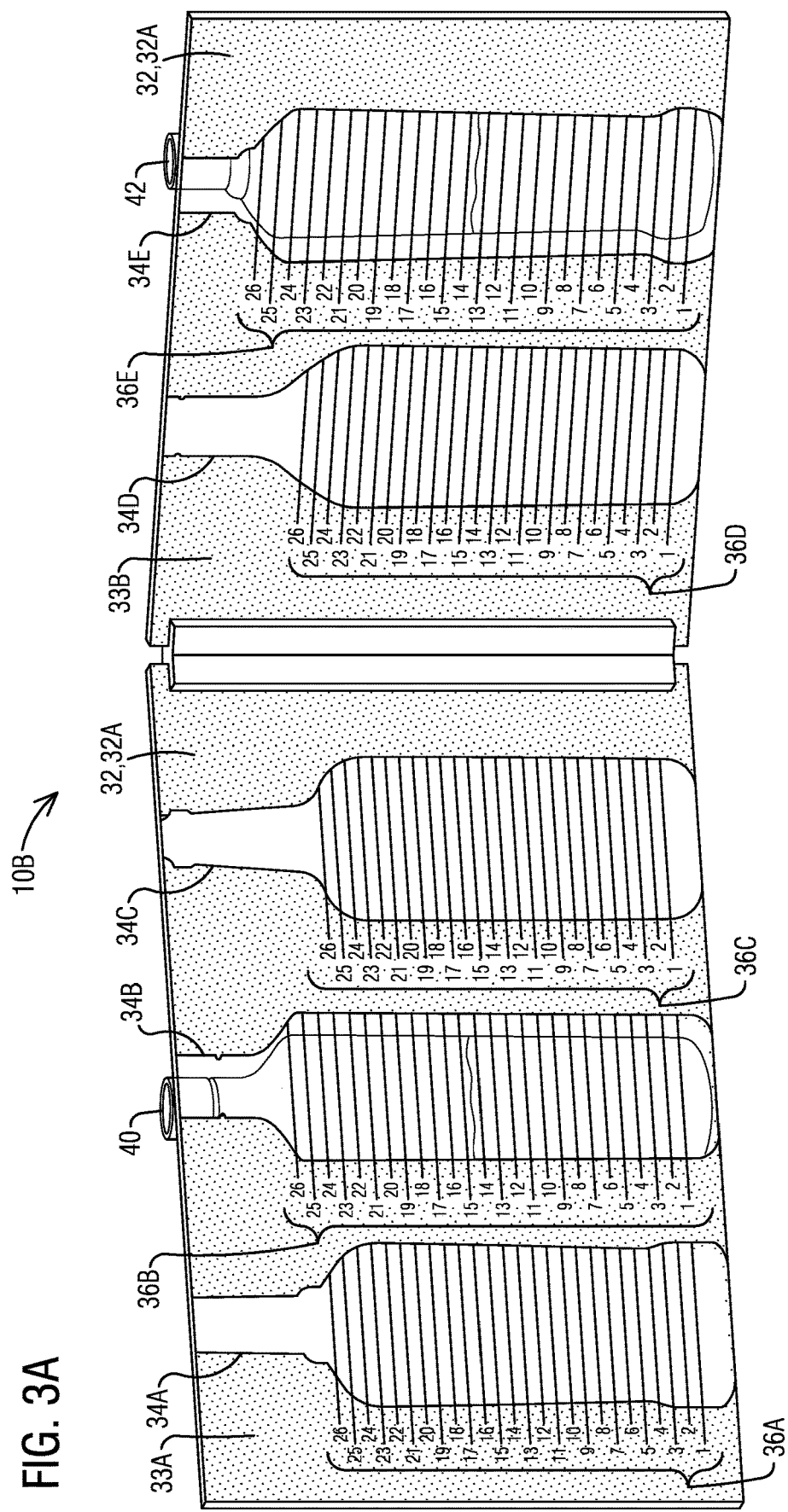
FIG. 3A is a front perspective view of a third embodiment of the invention

In the embodiment shown in FIGS. 3A and 3B, two substrates 32 are shown pivotally connected to each and pivoted to an open position for use. The two substrates 32 may also be folded together for storage. While this embodiment shows two connected substrates, the invention is not so limited, and may include a single substrate or more than two substrates. For example, an embodiment may include three substrates connected in a tri-fold manner.

Similar to the above-described embodiments, the substrates 32 include a first side 32A and second side 32B. Each includes shaded backgrounds 33A, 33B that form or define a plurality of bottle profiles 34A-34E and each bottle profile corresponds to a geometric shape or outline of a bottle of a brand of liquor. In the embodiments of FIGS. 2, 3A and 3B each bottle profile 14A-14C and 34A-34E is different relative to another bottle profile. In addition, a plurality of volume scales 36A-36E are provided and preferably printed on the second side 32B with the background 33, and each scale 36A-36E is associated with a corresponding bottle profile 34A-34E. Bottles 40, 42 are shown adjacent bottle profiles 34B, 34E, which correspond to the geometric shape of the bottle. In this manner, a level of fluid or liquor may be determined by comparing the level of fluid to the volume scales 36B, 36E.

Figure 4:
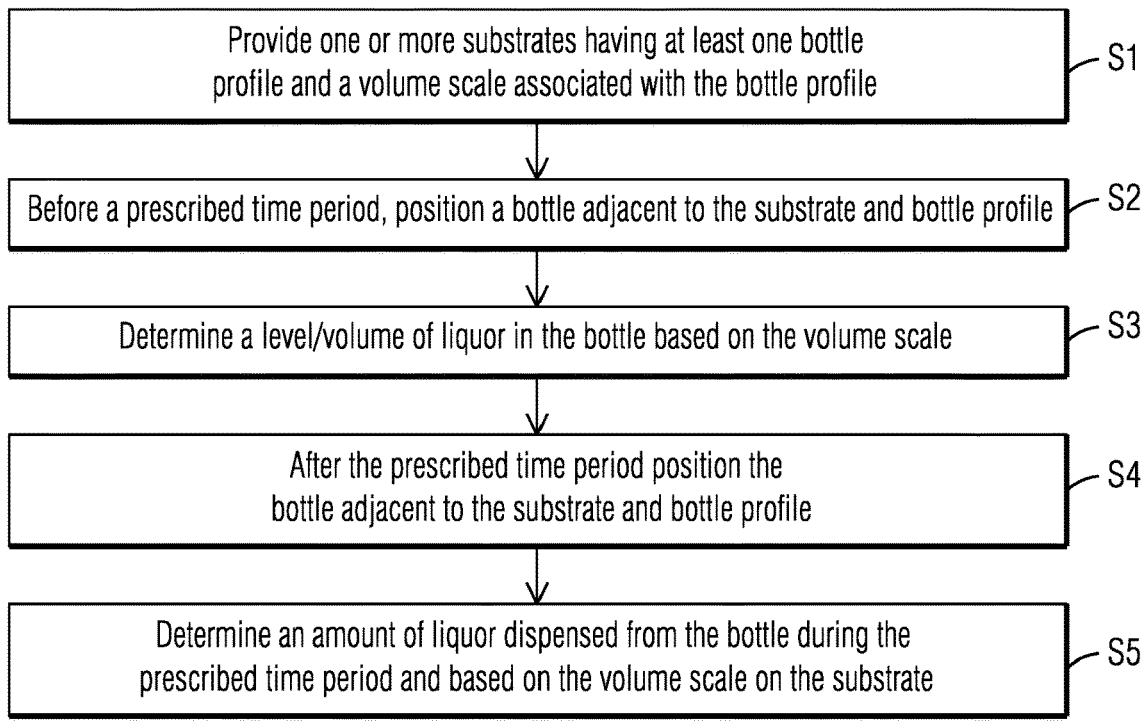
FIG. 4 is a flow chart including steps for a method in accordance with aspects of the invention.

In practice, a bar tender or bar manager will preferably have multiple substrates 12, 22, and/or 32 to represent an inventory of liquor bottles to be served for a prescribed time period. In reference to FIG. 4, steps S1-S5 of a method according to aspects of the invention are provided. Before the beginning of the prescribed time, for example before the beginning of an event in which alcohol is served, and according to steps S2 and S3, a bar tender or bar manager will take each bottle of liquor being represented on the substrates 12, 22, 32 and measure or determine the volume of liquor in each bottle based on the volume scales 16, 16A-16C, 36A-36E for each respective bottle profile 14, 14A-C, 34A-34E. As shown in FIGS. 2, 3A and 3B, a bottle 40, 42 is placed adjacent to a corresponding profile 34B, 34E. The bar tender preferably then records a measured volume of the bottle. These steps are preferably repeated for each bottle that is represented on the substrates 12, 22, 32.

With respect to step S4, after the prescribed time period has elapsed, each bottle represented on the substrates 12, 22, 32s again placed adjacent to a bottle profile 14, 14A-14C, 34A-34E and a user records a second measured volume of alcohol in the bottle. The bar tender then compares the second measured volume to the first measured volume to determine (step S5) the amount or volume of alcohol dispensed for each respective bottle during the prescribed time period. In this manner, an accurate measurement or an estimate of alcohol dispensed during the prescribed time period can be made and a customer can be accurately invoiced for the dispensed alcohol.

The above-described method is not limited to a particular number of steps as described above or listed in FIG. 4, and may include fewer or more steps, or more than one step may be included as a single step. In addition, the method in accordance with aspects of the invention is not limited to an particular order of the above described steps or the order of steps.

While certain embodiments of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. An apparatus for measuring a volume of liquor dispensed from a bottle, comprising:
  at least one transparent substrate having a first side and an opposite second side;
  at least one profile of a bottle on the first side or second side of the substrate and the at least one bottle profile has a geometric shape that corresponds to a geometric shape of a bottle of a brand of liquor;
  at least one volume scale on the first side or second side of the substrate, and the at least one volume scale includes a plurality of alphanumeric designations and a plurality of lines and each alphanumeric designation is associated with a line indicating a corresponding volume of liquor; and,
  wherein a shaded background is on the substrate surrounding the bottle profile and the volume scale is on the same side as the shaded background and bottle profile and each alphanumeric designation is on the shaded background and at least a portion of each line is on the shaded background.

2. The apparatus of claim 1, wherein each line extends across a width of the at least one bottle profile.

3. The apparatus of claim 1 wherein the transparent substrate is composed of a transparent acrylic resin material or a transparent plastic material.

4. The apparatus of claim 1 wherein the at least one substrate includes a plurality of substrates and each of the substrates is pivotally connected to an adjacent substrate.

5. An apparatus for measuring a volume of liquor dispensed from a bottle, comprising:
    at least one transparent substrate having a first side and an opposite second side;
    at least one profile of a bottle on the first side or second side of the substrate and the at least one bottle profile has a geometric shape that corresponds to a geometric shape of a bottle of a brand of liquor;
    at least one volume scale on the first side or second side of the substrate, and the at least one volume scale includes a plurality of alphanumeric designations and a plurality of lines and each alphanumeric designation is associated with a line indicating a corresponding volume of liquor; and,
    wherein the at least one bottle profile comprises a plurality of bottle profiles and each bottle profile corresponds to a geometric shape of a bottle of a brand of liquor and each bottle profile and brand of liquor is different and the at least one volume scale includes a plurality of volume scales and each volume scale is associated with a corresponding bottle profile;
    wherein a shaded background is on the substrate surrounding each bottle profile and each alphanumeric designation of each volume scale is on the shaded background and at least a portion of each line of each volumetric scales is on the shaded background.

6. An apparatus for measuring a volume of liquor dispensed from a bottle, comprising:
    at least one transparent substrate having a first side and an opposite second side;
    a shaded background formed on the first side or second side of the substrate outlining at least one transparent bottle profile having a geometric shape of a bottle corresponding to a brand of liquor; and,
    at least one volume scale on the side of the substrate as that of the shaded background and the at least one volume scale is associated with the at least one bottle profile, wherein the at least one volume scale includes a plurality of numbers on the shaded background and a plurality of lines, each line being associated with a number, and each line begins on the shaded background and extends across a width of the at least one transparent bottle profile.

7. The apparatus of claim 6, wherein the at least one transparent bottle profile includes a plurality of transparent bottle profiles and each bottle profile has a geometric shape that corresponds to a geometric shape of a bottle of a brand of liquor and each geometric shape, brand of liquor and bottle profile is different.

8. The apparatus of claim 7, wherein the at least one volume scale includes a plurality of scales and each scale is associated with a bottle profile.

9. The apparatus of claim 6, wherein the transparent substrate is composed of a transparent acrylic resin material or a transparent plastic material.

10. The apparatus of claim 6, wherein the at least one substrate includes a plurality of substrates and each of the substrates is pivotally connected to an adjacent substrate.

* * * * *